US007953236B2

(12) United States Patent
Vronay

(10) Patent No.: US 7,953,236 B2
(45) Date of Patent: May 31, 2011

(54) AUDIO USER INTERFACE (UI) FOR PREVIEWING AND SELECTING AUDIO STREAMS USING 3D POSITIONAL AUDIO TECHNIQUES

(75) Inventor: David Vronay, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1586 days.

(21) Appl. No.: 11/123,638

(22) Filed: May 6, 2005

(65) Prior Publication Data

US 2006/0251263 A1 Nov. 9, 2006

(51) Int. Cl.
*H04R 5/02* (2006.01)
*G06F 17/00* (2006.01)

(52) U.S. Cl. .......................................... 381/310; 700/94

(58) Field of Classification Search .................... 381/17, 381/18, 119, 61, 309, 310; 700/94
See application file for complete search history.

(56) References Cited

U.S. PATENT DOCUMENTS 5,521,981 A * 5/1996 Gehring .......................... 381/17
5,880,388 A * 3/1999 Kajiyama et al. ............... 84/609
7,058,168 B1 * 6/2006 Knappe et al. ........... 379/204.01
7,180,997 B2 * 2/2007 Knappe .................... 379/202.01

OTHER PUBLICATIONS

Crispien, K. and H. Petrie, Providing access to GUIs for blind people using a multimedia system based on spatial audio presentation, *Proc. of the 95th AES Convention*, New York, Oct. 7-10, 1993.

Goose, S. and C. Möller, A 3D audio only interface web browser: Using spatialization to convey hypermedia document structure, *ACM Multimedia*, 1999, vol. 1, pp. 363-371.

Hiipakka, J., and G. Lorho, A spatial audio user interface for generating music playlists, *Proc. of the 2003 Int'l Conf. on Auditory Display*, Boston, MA, Jul. 6-9, 2003, pp. 267-270.

Kirkeby, O., A balanced stereo widening network for headphones, *Proc. AES 22nd Int. Conf. on Virtual, Synthetic and Entertainment Audio*, Espoo, Finland, Jun. 15-17, 2002, pp. 117-120.

Lorho, G., J. Marila, and J. Hiipakka, Feasibility of multiple non-speech sounds presentation using headphones, *Proc. of ICAD '01*, Espoo, Finland, Jul. 29-Aug. 1, 2001, pp. 32-37.

Lorho, G., J. Hiipakka, and J. Marila, Structured menu presentation using spatial sound separation, *Proc. Mobile HCI 2002*, Pisa, Italy, Sep. 18-20, 2002, pp. 419-424.

Ludwig, L., N. Pincever, and M. Cohen, Extending the notion of a window system to audio, *IEEE Computer*, 1990, pp. 66-72.

Mynatt, E., and W. K. Edwards, Mapping GUIs to auditory interfaces, *Proc. of ACM Symposium on User Interface Software and Technology (UIST)*, 1992.

(Continued)

*Primary Examiner* — Ping Lee
(74) *Attorney, Agent, or Firm* — Lyon & Harr, LLP; Richard T. Lyon

(57) ABSTRACT

An audio user interface (UI) for comparing and selecting audio streams is presented. In general, the present invention allows a user to preview and navigate among multiple audio streams (audio sources) using three dimensional (3D) positional audio techniques to position the various sources in an audio field programmatically in such a way as to fool the brain into thinking the sound is located at a particular location in the space surrounding the user. When the user selects a preview mode, the various streams are placed in the space in a carousel-like manner. The user can move the sources forward or backward. As this is done, other audio streams can be added and dropped. Selecting a sound source will cause it to fill the audio field and the other sources will then cease to play.

21 Claims, 5 Drawing Sheets

OTHER PUBLICATIONS

Nilsson, M., ID3 tag version 2.4.0, Nov. 1, 2000, available from http:www.id3.org/develop.html.

Pauws, S., D. Bouwhuis, E. Eggen, Programming and enjoying music with your eyes closed, *Proc. of CHI2000*, The Hague: ACM Press Addison-Wesley, 2000, pp. 369-376.

Savadis, A., C. Stephanidis, A. Korta, K. Crispien, K. Fellbaum, A generic direct-manipulation 3D-auditory environment for hierarchical navigation in non-visual interaction, *Proc. of Assets '96*, New York, ACM, pp. 117-123.

Sawhney, N. and C. Schmandt, Nomadic radio: Speech and audio interaction for contextual messaging in nomadic environments, *ACM Transactions on Computer-Human Interaction*, Sep. 2000, vol. 7, No. 3, pp. 353-383.

Walker, A., S. A. Brewster, D. McGookin and A. Ng, Diary in the sky: A spatial audio display for a mobile calendar, *Proc. of BCS IHM-HCI 2001*, Lille, France, Springer, pp. 531-540.

* cited by examiner

AUDIO USER INTERFACE (UI) FOR PREVIEWING AND SELECTING AUDIO STREAMS USING 3D POSITIONAL AUDIO TECHNIQUES

BACKGROUND

1. Technical Field

The invention is related to audio user interfaces, and more particularly to an audio user interface (UI) for comparing and selecting among multiple audio streams.

2. Background Art

The use of visual user interfaces with small devices such as portable audio and media players, cell phones, and Microsoft Corporation's Smart Personal Object Technology devices is problematic. These types of devices have very small display screens, or no screens at all. As such, a user cannot reasonably rely on visual user interfaces to perform many tasks.

One of the tasks associated with the aforementioned devices involves selecting an audio stream from a number of candidate streams. In order to make a selection, the user often has an existing selection which they want to compare to new candidate selections to make a decision between them. For example, when a user is selecting a station on a radio, often they are comparing the new station to their previous station. Current approaches to these comparison and selection tasks can be said to fall into two categories.

The first approach is simply channel changing, where the user switches to a new audio stream (for example, pressing a preset on the radio or pressing the scan button). However, this approach has some drawbacks. First, it is very slow. Each possible channel has to be previewed individually. Second, the user has no way of comparing their current selection to the new selection. Third, the user has no way of knowing what is coming up—if the next station will be better or worse.

The second approach is to use a textual display to provide information. For instance, a MP3 player can provide a list of songs for the user to select, or an internet radio can provide the names of the stations. This also has problems. Most glaring is that the user has to make the connection between the displayed text and the nature of the audio stream. A song title might suffice is the user is familiar with the song, but the name of the radio station is less informative, as is the name of song not known the user. Granted, more information could be displayed. However, many modern MP3 players are designed to be quite tiny and cannot support a large screen. Thus, the amount of information that can be shown to the user is extremely limited. In addition, the number of alternative selections that can be shown to the user is similarly limited when the display is small. Another disadvantage of the textual display approach is that there are times where it is inappropriate to look at the screen. For example, when one is jogging, riding a bike, or driving a car.

One possible solution is to employ a 3D positional audio user interface to accomplish the comparison and selection tasks. 3D positional audio is an existing technology [see Goose, S and Moller C., "A 3D Audio Only Interface Web Browser: Using Spatialization to Convey Hypermedia Document Structure", *ACM Multimedia* (1) 1999: 363-371]. It allows sound to be positioned in space programmatically. In essence, a 3D audio system mixes and filters sound into two or more speakers in such a way as to fool the brain into thinking the sound is located at a particular location external to the user. The present invention employs this approach.

SUMMARY

The present invention is directed toward an audio user interface (UI) for comparing audio sound sources and selecting one of the sources. This type of previewing and selecting among various audio streams can be done without the aid of a visual user interface, particularly in handheld and mobile devices. In general, the present invention allows a user to preview and navigate among multiple audio streams (referred to alternately as audio sound sources, sound sources or just sources herein) using three dimensional (3D) positional audio techniques to position the various sources in an audio field programmatically in such a way as to fool the brain into thinking the sound is located at a particular location in the space surrounding the user. When the user selects a preview mode, the various streams are placed in the space in a carousel-like manner. The user can move the carousel forward or backward. As the carousel rotates, other audio streams can be added to and shifted off the carousel. Selecting a sound source will cause it to fill the audio field and the other sources will then cease to play.

More particularly, the present audio UI runs on a computer system having multi-channel audio equipment, a 3D positional audio capability and a user interface input device. Initially, a sound source chosen among a plurality of available sound sources is played in the space surrounding the user in a non-positional, multi-channel playback mode (e.g., in stereo or surround sound). The sound sources can be musical pieces, a computer network radio station, or non-musical pieces, among others, which are resident in a memory of the computer system or accessible by the computer system via an external device or a computer network. The initial sound source can be a predetermined default choice, a randomly chosen source, or a user-specified source.

Upon entry of a preview command to the computer system by the user via the aforementioned input device, several things occur. First, the audio source currently being played in the non-positional, multi-channel playback mode is collapsed and played such that the source seems to a user to be coming from a location in the surrounding space adjacent to one of the user's ears. In one embodiment of the present invention this current source is played adjacent the user's non-dominant ear. Which ear is dominate or non-dominant can be specified ahead of time by the user. In addition, a group of candidate audio sound sources is played such that it seems to the user that each of the candidate sources is coming from a separate location in the surrounding space adjacent the user's other (e.g., dominant) ear. These candidate sound sources are taken from the aforementioned plurality of available sources. By playing the current source adjacent one ear and the group of current candidate sources adjacent the user's other ear, the user is able to compare each of the candidate sound sources to the current sound source. The user then has the option to select one of the candidate sound sources via the aforementioned input device, or to enter a cancellation command that cancels the preview mode. If the user selects one of the candidate sound sources, the present UI ceases playing the current source and the candidate sources in the above-described positional modes, and instead plays the selected sound source in the non-positional, multi-channel playback mode. Similarly, if the user enters the preview cancellation command, the present UI ceases playing the current source and the candidate sources in the above-described positional modes. However, in this case, the current sound source is once again played in the non-positional, multi-channel playback mode.

In regard to playing the group of candidate audio sound sources such that it seems to the user that each of the group of candidate sources is coming from a separate location in the surrounding space adjacent one of the user's ears, this is accomplished by making it seem each source is emanating from a separate consecutive location within a pattern of locations forming a path extending away from the user. This path can take several shapes. For instance, in one embodiment, the path extends away from the user in two directions such that one of the path locations is closest to the user's ear, some of the locations are in the space in front and to one side of the user and the remaining locations are in the space behind and to the same side of the user. A version of this embodiment employs a path formed by a pair of convex arcs each extending away from the user from the path location that is closest to the user's ear. It is also noted that in one embodiment of the present UI, the group of candidate sound sources is initially limited to a prescribed number which are played from consecutive locations on just one of the arcs starting with the location that is closest to the user's ear.

The aforementioned selection procedure involves the user bringing a desired sound source to the path location nearest his or her ear. This is accomplished by "rotating" the sources along the path in a carousel-like fashion. More particularly, upon entry of a command by the user via the aforementioned input device to shift the candidate sound sources in a forward direction, each of the candidate sound sources currently being played is shifted to the next adjacent location along the path in the forward direction. This results in the candidate sound source that is closest to the user's ear being shifted to a location in the path in a direction away from the user and a different one of the current candidate sound sources being shifted to this closest location. In addition, a new sound source taken from the plurality of sources is added to the group of candidate sound sources (if one is available), and played at the location on the path that was previously held by the current candidate sound source that was furthest away from the user in the direction opposite the forward direction prior to entry of the shift command. Further, if all the path locations are filled when the shift command is entered, then the current candidate sound source that resided at the path location furthest from the user in the forward direction along the path prior to entry of the shift command is removed. Still further, if there is no candidate sound source available to shift to the location closest to the user's ear, then the forward shift command is ignored and the candidate sound sources are left in there current locations.

In addition to a forward shift command, the user can also enter a command via the input device to shift the candidate sound sources in a reverse direction. When the reverse shift command is entered, each of the current candidate sound sources is shifted to the next adjacent location along the path in the reverse direction. The current candidate sound source that is closest to the user's ear is shifted to a location in the path in a direction away from the user and a different one of the candidate sound sources is shifted to the location closest to the user's ear, unless there is no candidate sound source in the location adjacent the candidate sound source closest to the user's ear in the direction along the path opposite said reverse direction. In such a case, the reverse shift command is ignored and the candidate sound sources are left in there current locations. In addition, it is noted that the candidate sound sources can be sequentially ordered. If so, then the reverse shift command can also result in adding a candidate sound source taken from the plurality of sound sources that represents the source in the sequential order immediately preceding the current candidate sound source that resided at the location furthest away from the user in the direction along the path opposite the reverse direction prior to entry of the reverse shift command. This added candidate sound source would be played at that furthest location, but only if there was a candidate sound source there before the reverse shift command was entered. Still further, if there is a current candidate sound source residing at the path location furthest away from the user in the reverse direction along the path prior to entry of the reverse shift command, then the candidate sound source residing at that path location is removed.

The present UI can also include a categorization feature. This feature involves categorizing each of the plurality of sound sources in accordance with an identifying characteristic prior to playing them. The sound sources are then sequentially ordering based on the categorization. When the candidate sound sources are played, they are played such that it seems to the user that each source is coming from a separate consecutive location within the path in the aforementioned sequential order. Further, aurally distinct audio markers can be established. These markers are a continuously repeated letter, word, phrase or other sound indicative of a demarcation between the sound source categories. When the candidate sound sources are played, the audio marker associated with one or more candidate sound sources is played in a path location preceding the location or locations where the associated sound sources are playing.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
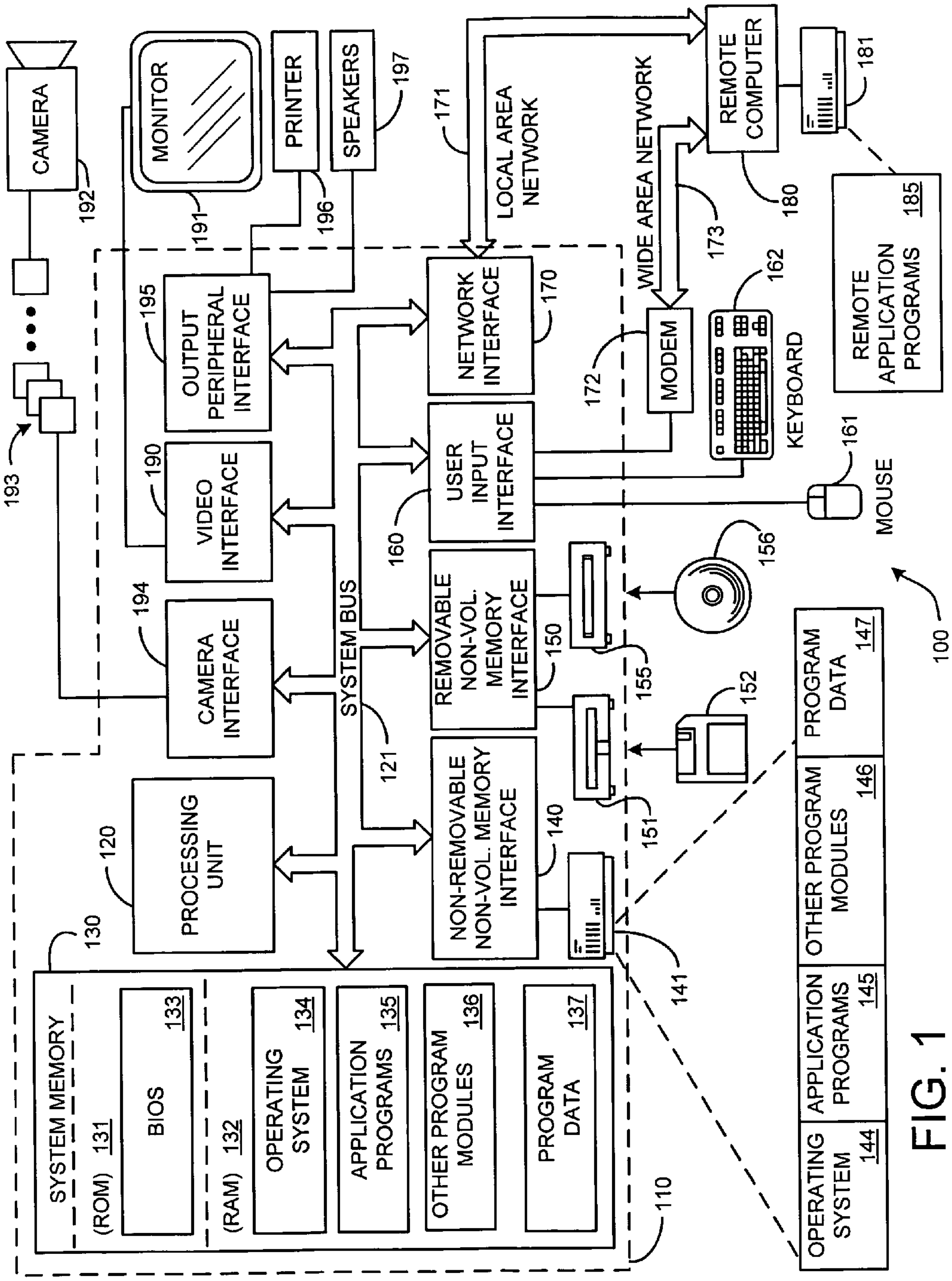
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 The Audio Source Selection User Interface

As indicated previously, the present audio user interface (UI) for comparing and selecting audio sources employs 3D positional audio to solve the problem of providing a rich selection of audio sources for a user to compare and choose from. This is possible because a human being is able to isolate and comprehend individual sound sources from a plurality of such sources located within a space. This is the so-called "cocktail party effect" where a person can stand in a crowded room full of people having a multitude of separate conversations at different locations around a room, and still be able to select and concentrate on listening to any single conversation at a particular location while ignoring all the other conversations going on at other locations. In general, the present UI employs standard 3D positional audio techniques to make it sound as if individual sound sources are emanating from different locations within a space surrounding the user. The user can then isolate and listen to each or some of the sound sources from a number of candidate sources. A candidate source of interest can then be compared to a previously selected, current source. If the user prefers one of the candidate sources, he or she can select that source to replace the current source.

A conventional multi-channel audio system, associated with a computing device such those described previously, is used to produce the desired localized sound sources in conjunction with a conventional 3D positional audio program and the present audio source selection UI, which are running on the computing device. This multi-channel audio system can be a stereo system, 5.1 system, 7.1 system, or others. In addition, the audio system can employ two or more speakers placed about the user's space, or involve the use of headphones.

The audio sources can be any multi-channel (or synthesized multi-channel) audio stream. For example, each audio source could be a song or other musical piece, an Internet "radio" station, or any non-musical audio track (e.g., speech, background sounds, and the like).

The aforementioned UI for comparing and selecting audio sources will now be described in more detail in the sections to follow.

2.1 Previewing Sound Sources

Figure 2:
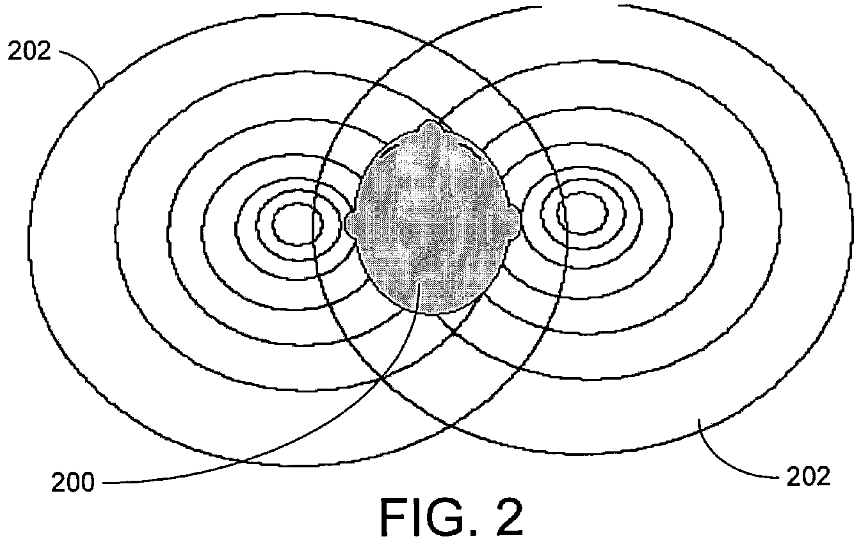
FIG. 2 is a diagram depicting playing an audio sound source to a user in a non-positional, multi-channel playback mode.

The present UI is initiated in a normal listening mode in which one of the available sound sources is played to the user. The sound is standard multi-channel audio, and as such is not positional audio. FIG. 2 shows a representation of the listener 200 (looking from above), and the initial sound source 202, as coming to both ears from all points in space. The choice as to what source is initially played to the user when the present system and process is initiated can be a default choice, or a randomly chosen source, or even a source that the user has designated ahead of time.

Figure 3:
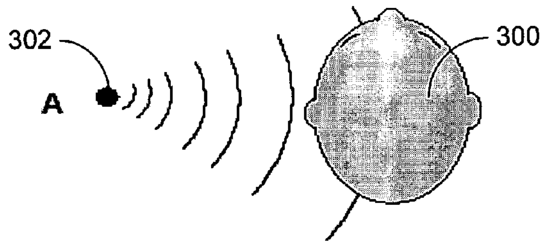
FIG. 3 is a diagram depicting playing the audio sound source of FIG. 2 in a positional mode such that the source seems to the user to be coming from a location adjacent one of the user's ears.
Figure 4:
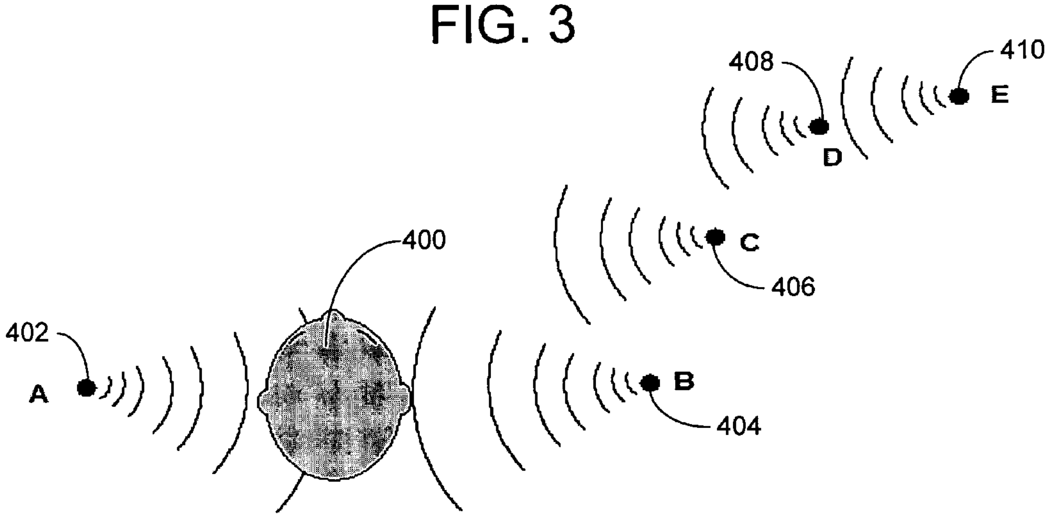
FIG. 4 is a diagram depicting playing the positional audio sound source of FIG. 3, and in addition, playing a group of candidate audio sound sources in positional modes such that it seems to the user that each of the group of candidate sources is coming from a separate location in the surrounding space adjacent the user's other ear, thereby allowing the user to compare each of the candidate sound sources to the current sound source.

When the user wants to compare the existing source to other available sources, he or she enters a preview mode. This is accomplished in any conventional way using an input device that is in communication with the aforementioned computing device. For example, entering the preview mode may entail pressing a prescribed key on a keyboard. Upon activation of the preview mode, the multi-channel field of source A will collapse into a single point of positional audio. In one embodiment of the present UI, this point is near the user's non-dominant ear. FIG. 3 shows an example where the positional audio source A 302 seems to the user 300 to be coming from a point by his or her left ear. After source A is positioned, additional audio streams corresponding to other ones of the available sources are positioned and played for previewing, one by one, in an audio field adjacent the user's other (e.g., dominant) ear. In one embodiment, this is accomplished by making each audio stream seem to the user to be coming from a different point within the audio field. This is shown in FIG. 4, where audio source B (404), then C (406), then D (408), and then E (410) being added to the soundscape with source B being placed nearest the user's ear and the others periodically positioned in an arc trailing away from and to the front of the user 400. In one embodiment of the present invention, even if there are more sound sources available, only the first four or so are initially previewed, as shown in FIG. 4. It is noted that the dominant ear will vary from one individual to another. Accordingly, the present system and process can include a provision for the user to pre-select which ear is to be treated as the dominant ear.

The foregoing UI takes advantage of the human's ability to discern dozens of simultaneous sound sources—the aforementioned "cocktail party effect". Thus, the user can easily shift their attention to any sound in the field, easily comparing and contrasting different sounds.

Figure 5:
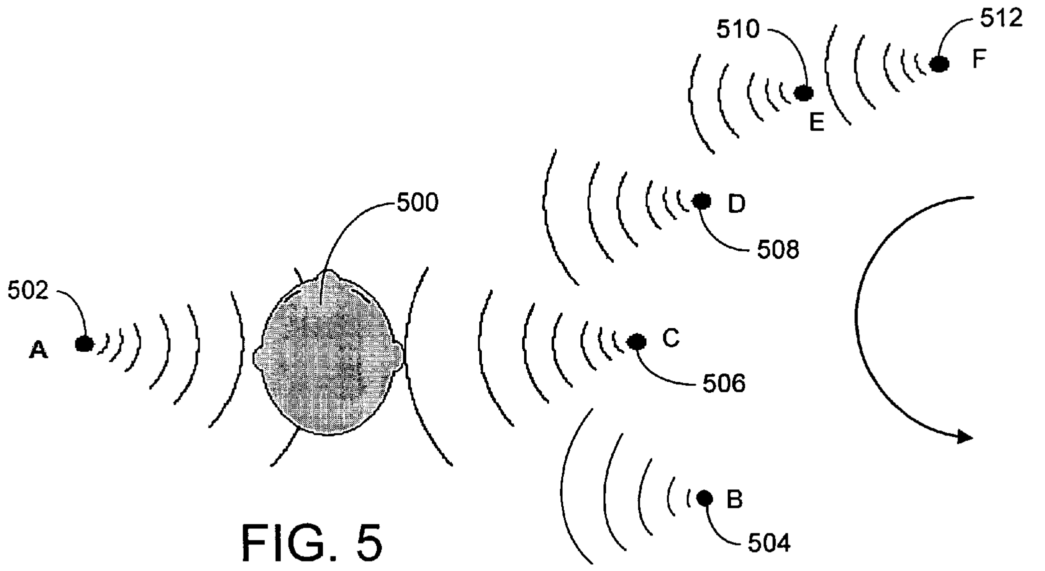
FIG. 5 is a diagram depicting the results of implementing a next (i.e., forward shift) command to the configuration of FIG. 4 such that the locations where the group of candidate audio sound sources seem to the user to be coming from are rotated in a carousel fashion in a forward direction indicated by the arrow and a new candidate source F is added.
Figure 6:
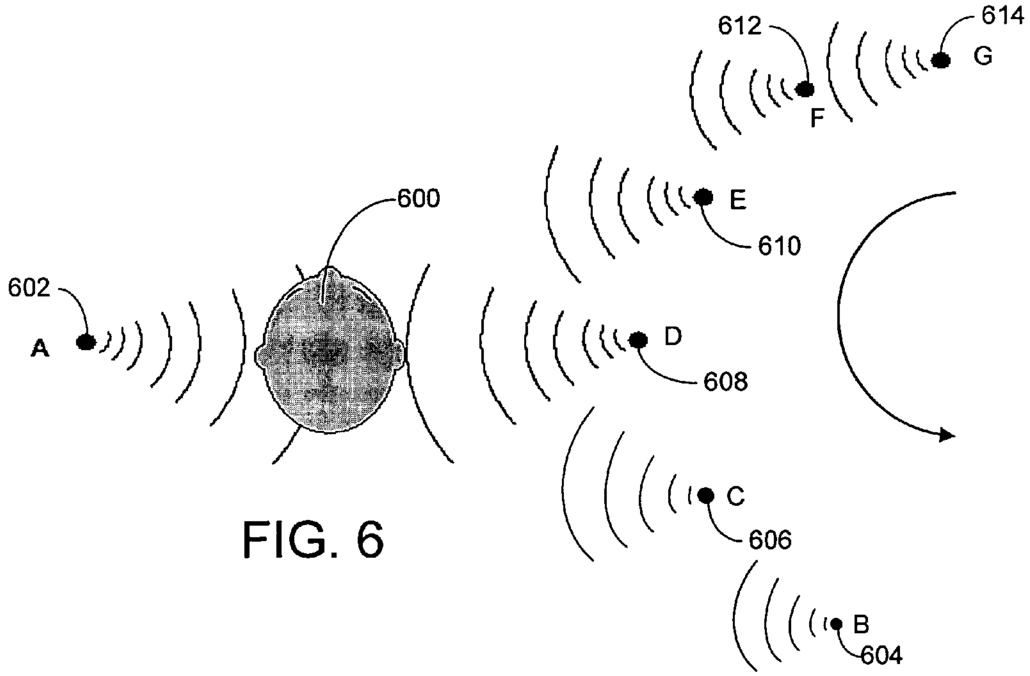
FIG. 6 is a diagram depicting the results of implementing the next command to the configuration of FIG. 5 such that the locations where the group of candidate audio sound sources seem to the user to be coming from are rotated in the forward direction and a new candidate source G is added.
Figure 7:
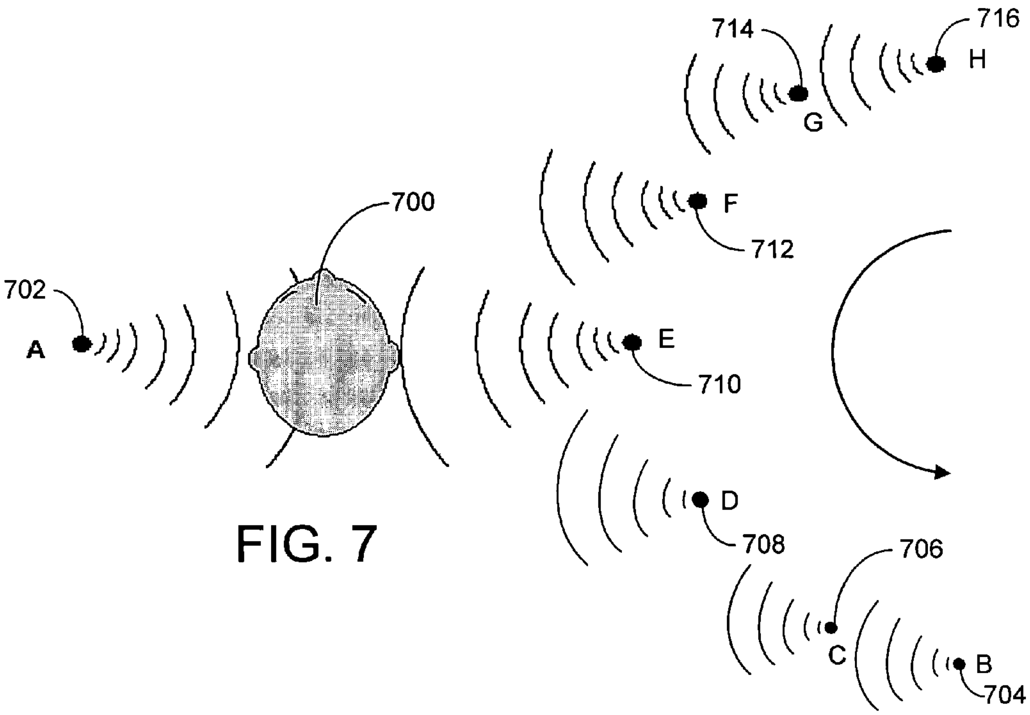
FIG. 7 is a diagram depicting the results of implementing the next command to the configuration of FIG. 6 such that the locations where the group of candidate audio sound sources seem to the user to be coming from are rotated in the forward direction and a new candidate source H is added.
Figure 8:
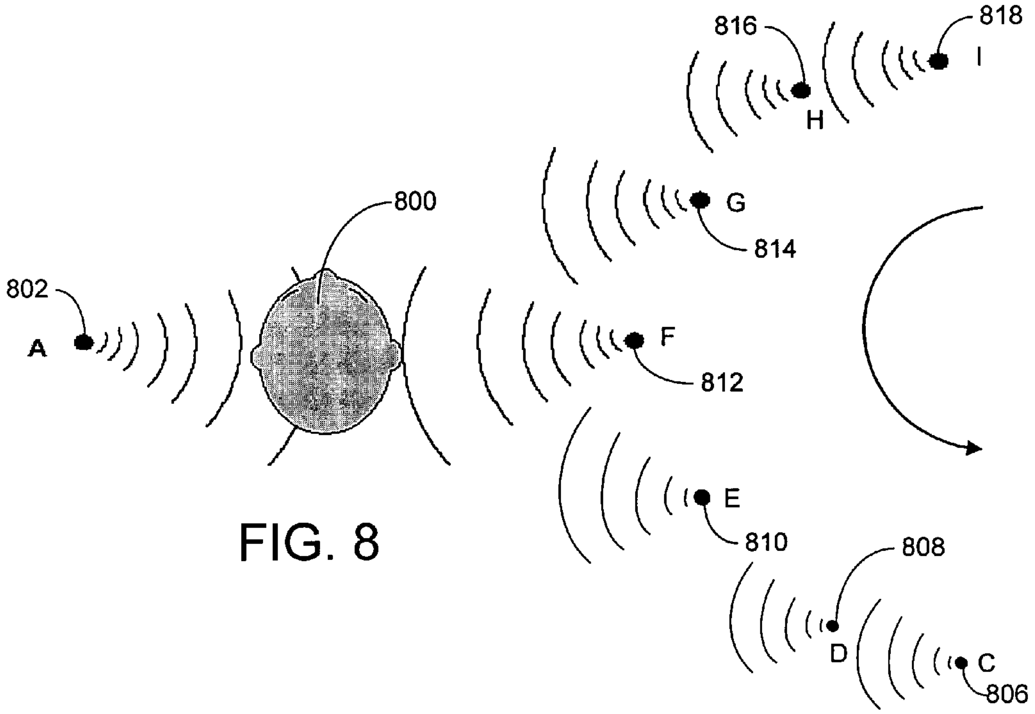
FIG. 8 is a diagram depicting the results of implementing the next command to the configuration of FIG. 7 such that the locations where the group of candidate audio sound sources seem to the user to be coming from are rotated in the forward direction causing a new candidate source H to be added and previous candidate source B to be dropped.

Once in preview mode, the user can move the sound source forward or backwards in a carousel fashion by invoking a navigation mode of the UI. This can be accomplished by initiating a next source or previous source command using the aforementioned input device. For example, initiating the next or previous command might entail pressing different keys on a keyboard. It is noted that in the initial condition where only four or so sources are previewed in the manner shown in FIG. 4, the user can only initiate the next command. Assuming that the user invokes the next command, the result of the action is to cause the candidate sound sources to rotate such that source C (506) is brought to the position previously held by source B (504), and source B seems to the user to move to a new location along an arc stretching away from and to the rear of the user (500), as shown in FIG. 5. In addition, sources D (508) and E (510) move toward the user into the positions previously held by the source C and D sources, respectively. Further, a new source F (512) is added to the candidate sources and is positioned in the location previously held by source E. If the user again initiates the next command the sources are again rotated in the manner described above, with a new source G (614) being added and source D (608) being made closest to the user's ear, as shown in FIG. 6. If the user initiates the next command once again, the sources are rotated as before, with a new source H (716) being added and source E (710) being made closest to the user's ear, as shown in FIG. 7. Then, if the user initiates the next command one more time, the sources are rotated, with a new source I (818) being added, the source F (812) being made closest to the user's ear, and source B dropping off, as shown in FIG. 8. This process of bringing the next sound source in line to the position nearest the user's ear, as well as adding a new one of the available sources to the candidate sources being previewed and dropping a previously previewed source, can continue each time the next command is initiated until the last available sound source is brought to the position nearest the user's ear.

Figure 9:
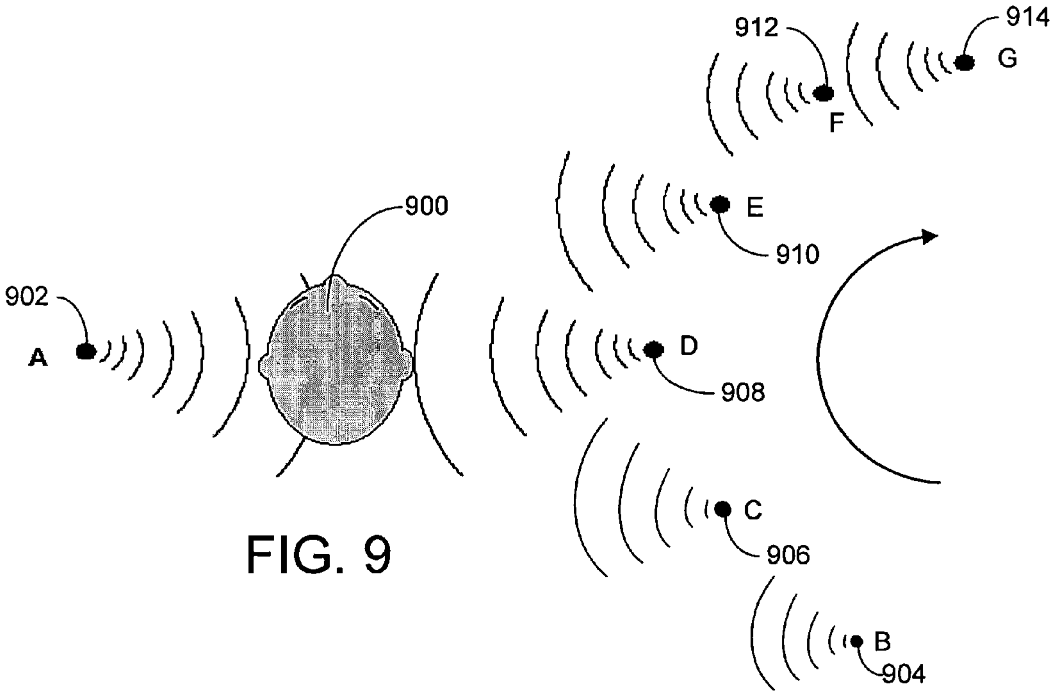
FIG. 9 is a diagram depicting the results of implementing a previous (i.e., reverse shift) command to the configuration of FIG. 7 such that the locations where the group of candidate audio sound sources seem to the user to be coming from are rotated in the reverse direction indicated by the arrow causing candidate source H to be dropped.
Figure 10:
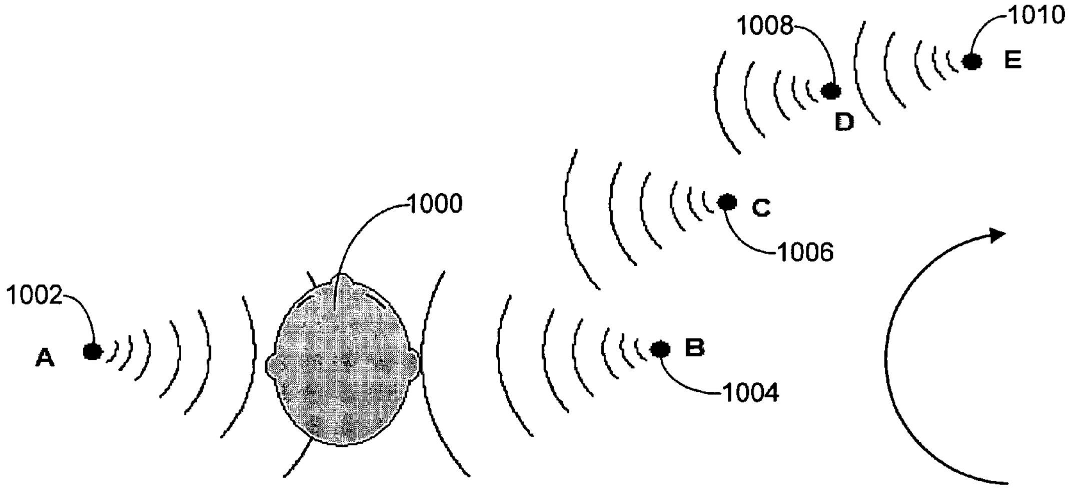
FIG. 10 is a diagram depicting the limit of implementing the previous command such that the locations where the group of candidate audio sound sources seem to the user to be coming from are rotated back in the reverse direction to the original configuration of FIG. 4.

When the user initiates the previous command (after having already initiated the next command at least once), the candidate sources are rotated in the opposite direction than that described above. Thus, for example if sources B-H (702, 704, 706, 708, 710, 712, 714) are initially positioned as shown in FIG. 7 when the user initiates the previous command, the sources are rotated such that source D (906) is brought closest to the user's ear and source H is dropped, as shown if FIG. 9. Each subsequent time the user initiates the previous command, the sources rotate in the same manner. The limit of the previous command is when source B (1004) is brought closest to the user's ear and only the sources C (1006), D (1008) and E (1010) remain trailing in an arc away from and to the front of the user 1000, as shown in FIG. 10.

It is also noted that if the group of candidate sound sources had been previously rotated in the forward direction to an extent that a previously previewed source was dropped (as illustrated in FIG. 8 where source B was dropped from the candidate source configuration shown in FIG. 7), then implementing the previous command can also result in such a previously dropped candidate source being added and played from the location in the path furthest from the user's ear in the direction opposite the reverse direction. In order to accomplish the foregoing "resurrection" of a previously dropped candidate sound source, the sources are assigned a sequential order. In this case the candidate sources are added, dropped, and re-added in accordance with the assigned sequential order. Thus, for example, the candidate source configuration of FIG. 8 would return to that of FIG. 7 when the previous command is entered by the user.

The foregoing example configurations employed an arc-shaped pattern of source locations with a maximum of seven sound source positioned along it. This configuration is believed to provide the user with a clear distinction between the sources, and to not put so many sources into play that it becomes overly confusing or causes the more distance ones be to overly faint. However, the maximum number of sound sources could be increased or decreased as desired, and the arc pattern could be replaced with other patterns, such as a line extending front to back, or a V-shaped pattern, among others. Regardless of the pattern, the sound sources would be moved in response to a next or previous command in a manner similar to that described above.

2.2 Selecting a Sound Source

When the user finds a source he or she would like to listen to in lieu of the source playing adjacent the user's opposite ear opposite (e.g., source A positioned to the left of the user in the previously-described example configuration), it can be selected by moving the desired source to the position closest to the user's ear (if not already in that position) and initiating a selection command. For example, this could entail pressing the aforementioned "preview" key again (although any conventional selection technique appropriate to the input device employed could be used). Initiating the selection command causes the original sound source and the other non-selected candidate sound sources to immediately cease playing, or to fade out. In addition, the selected sound source is expanded from a positional source to fill the soundscape, thus returning to the normal listening mode shown in FIG. 2.

It is noted that the foregoing preview technique would allow a user to simulate the previously-described "channel changing" mode of selecting a sound source. This is accomplished by the user first initiating the preview command. This results in the current source being listened to, being positioned adjacent one of the user's ears and a group of candidate sources being played adjacent the user's other ear, as described above. The user then initiates the selection command. This results in the candidate sound source playing in the position closest to the user's ear being selected and filling the soundscape as also described above. Thus, the user can scan through the available sound sources by repeatedly initiating the preview command followed by the selection command. If the preview and selection commands are invoked by performing the same selection action on the input device being used (such as having the same key initiate the preview mode and then initiate the selection command as suggested previously), then the user need only perform the selection action twice in rapid succession to "change the channel".

It is further noted that the user could, after previewing the available sound source selections, decide to keep the current source. In such a case, the user would simply cancel the preview mode rather than selecting a candidate sound source. This is accomplished by invoking a cancel command in any conventional way, such as by pressing a prescribed key on the aforementioned input device.

3.0 Categorizing Sound Sources

The present UI can be particularly useful when the candidate sound sources are arranged according in some linear fashion based on the type of source. For example, if the sound sources are individual songs, they could be arranged by how "energetic" the music would seem to a listener. Thus, the sources could be arranged from the most "energetic" to the most "mellow". Often, a user is not sure how "mellow" they want their music. By previewing many songs at once, the user can decide how "far" they have to go—i.e., is it a big scroll or a small scroll.

The present UI can also be employed with very large audio collections that can include hundreds of songs. To assist the user in finding a particular song, the songs would be categorized ahead of time. Audio markers would then be added to the carousel to delineate the various categories. For example, the songs could be arranged alphabetically by artist, title, genre or any other appropriate identifying musical characteristic. The audio markers would then repeat an identifying letter, word, phrase or other sound in a loop at a position on the carousel preceding the song or songs identified by the marker. For instance, the audio markers could be the name of the artist or even simply a letter corresponding to the last name of the artist. A combination of markers could also be employed. For example, letter markers could be used to find a group of songs and then markers repeating the name of an artist would be included to let the user fine tune the search. The markers would have some audio filtering on them to make them stand out, such as being louder or having a higher pitch.

If the foregoing marker technique is incorporated in the present audio UI, it would also be possible to greatly increase the number of candidate sound sources playing at any one time. This is because the user could initially concentrate just on the category markers rather than the sound source to find the vicinity where a sound source of interest resides. The user would then concentrate on finding the particular sound source of interest in that part of the carousel. Thus, the previously-described confusion factor of having a large number of sound sources playing at once is reduced.

3.0 Alternate Embodiments

While the invention has been described in detail by reference to the preferred embodiment described above, it is understood that variations and modifications thereof may be made without departing from the true spirit and scope of the invention. For example, the present invention has been described in the context of a current sound source being positioned adjacent to one of the user's ears and candidate sources being played at locations adjacent the user's other ear. However, it is also possible to locate the current sound source in back of the user, and locate the candidate sources in a pattern of some type in front of the user, or vice versa.

Wherefore, what is claimed is:

1. A computer-implemented process for facilitating a user-comparison of a plurality of audio sound sources played using multi-channel audio equipment and a 3D positional audio capability and a user-selection of one of said sources using a user interface input device, said process comprising:

using a computer to perform the following process actions:

playing a current audio sound source using the audio equipment such that the source seems to a user to be coming from a location in the surrounding space adjacent a first of the user's ears, and wherein the current sound source is the only sound source seeming to the user to be coming from the surrounding space adjacent the first of the user's ears;

playing a group of candidate audio sound sources from said plurality of sources using the audio equipment such that it seems to the user that each of the group of candidate sources is coming from a separate location in the surrounding space adjacent the user's other ear, thereby allowing the user to compare each of the candidate sound sources to the current sound source; and upon selection of one of the candidate sound sources by the user via said input device, playing the selected source using the audio equipment in a non-positional, multi-channel playback mode, wherein said non-positional, multi-channel playback mode is not a mode employing 3D positional audio wherein the selected candidate sound source seems to the user to be emanating from a particular location in the surrounding space, but instead is a mode wherein the selected candidate sound source seems to the user to be emanating from two or more locations in the surrounding space.

2. The process of claim 1, wherein each of the audio sound sources can be either (i) a musical piece, (ii) an computer network radio station, or (iii) a non-musical piece, which are resident in a memory of the computer system or accessible by the computer system via an external device or a computer network.

3. The process of claim 1, wherein the current audio sound source is initially chosen from the plurality of sources, and is one of either (i) a predetermined default choice, (ii) a randomly chosen source, or (iii) a user-specified choice.

4. The process of claim 1, further comprising a process action of initially playing the current audio source in a non-positional, multi-channel playback mode, and playing the current audio sound source such that it seems to the user to be coming from a location in a surrounding space adjacent the first of the user's ears and playing the group of candidate audio sound sources such that it seems to the user that each of the group of candidate sources is coming from a separate location in the surrounding space adjacent the user's other ear, only after the user enters a preview command via said input device.

5. The process of claim 1, wherein the process action of playing the group of candidate audio sound sources such that it seems to the user that each of the group of candidate sources is coming from a separate location in the surrounding space adjacent the user's other ear, comprises an action of playing the group of candidate audio sound sources such that it seems to the user that each of the group of candidate sources is coming from a separate consecutive location within a pattern of locations forming a path extending away from the user.

6. The process of claim 5, wherein said path extends away from the user in two directions such that one of the path locations is closest to the user's ear, some of the locations are in the space in front and to one side of the user and the remaining locations are in the space behind and to the same side of the user.

7. The process of claim 6, wherein the number of candidate sound sources does not exceed a maximum number of locations of said pattern of locations, and wherein the process of playing the group of candidate audio sound sources further comprises the actions of:

upon entry of a command by the user via said input device to shift the candidate sound sources in a forward direction, shifting each of the current candidate sound sources to the next adjacent location along said path in the forward direction such that a current candidate sound source that is closest to the user's ear is shifted to a location in the path in a direction away from the user and a different one of the candidate sound sources is shifted to the location closest to the user's ear, adding to the group of candidate sound sources a new source taken from said plurality of sound sources, and playing the added sound source at the location on the path that was previously held by the current candidate sound source that was furthest away from the user in the direction opposite the forward direction prior to entry of the shift command.

8. The process of claim 6, wherein the number of candidate sound sources equals a maximum number of locations of said pattern of locations, and wherein the process of playing the group of candidate audio sound sources further comprises the actions of:

upon entry of a command by the user via said input device to shift the candidate sound sources in a forward direction, shifting each of the current candidate sound sources to the next adjacent location along said path in the forward direction such that the current candidate sound source that is closest to the user's ear is shifted to a location in the path in a direction away from the user and a different one of the candidate sound sources is shifted to the location closest to the user's ear, adding to the group of candidate sound sources a new source taken from said plurality of sound sources, playing the added sound source at the location on the path that was previously held by the current candidate sound source that was furthest away from the user in the direction opposite the forward direction prior to entry of the shift command, and removing the candidate sound source from the group of current candidate sources that resided at the path location furthest from the user in said forward direction along the path prior to entry of the shift command.

9. The process of claim 6, wherein the number of candidate sound sources equals a maximum number of locations of said pattern of locations and there are no sound sources in the plurality of sources that have not previously been designated as a candidate sound source, and wherein the process of playing the group of candidate audio sound sources further comprises the actions of:

upon entry of a command by the user via said input device to shift the candidate sound sources in a forward direction, shifting each of the current candidate sound sources to the next adjacent location along said path in the forward direction such that the current candidate sound source that is closest to the user's ear is shifted to a location in the path in a direction away from the user and a different one of the candidate sound sources is shifted to the location closest to the user's ear and removing the candidate sound source from the group of current candidate sources that resided at the path location furthest from the user in said forward direction along the path prior to entry of the shift command, unless there is no candidate sound source available to shift to the location closest to the user's ear, and whenever there is no candidate sound source available to shift to the location closest to the user's ear, ignoring the shift command and leaving the candidate sound sources in there current locations.

10. The process of claim 6, wherein each candidate sound source is sequentially ordered, and wherein the process of playing the group of candidate audio sound sources further comprises the actions of:

upon entry of a command by the user via said input device to shift the candidate sound sources in a reverse direction, whenever there is a candidate sound source in the location adjacent the candidate sound source closest to the user's ear in the direction along the path opposite said reverse direction, shifting each of the current candidate sound sources to the next adjacent location along said path in the reverse direction such that a current candidate sound source that is closest to the user's ear is shifted to a location in the path in a direction away from the user and a different one of the candidate sound sources is shifted to the location closest to the user's ear, adding to the group of candidate sound sources a source taken from said plurality of sound sources that represents the sound source in said sequential order immediately preceding the current candidate sound source that resided at the location furthest away from the user in the direction along the path opposite said reverse direction prior to entry of the shift command and playing the added sound source at that location, whenever there is a current candidate sound source residing at the path location furthest away from the user in the direction opposite the reverse direction prior to entry of the shift command, and removing the candidate sound source from the group of current candidate sources that resided at the path location furthest away from the user in said reverse direction along the path prior to entry of the shift command, whenever there is a current candidate sound source residing at that location, and whenever there is no candidate sound source in the location adjacent the candidate sound source closest to the user's ear in the direction along the path opposite said reverse direction, ignoring the shift command and leaving the candidate sound sources in there current locations.

11. The process of claim 6, wherein the path is formed by a pair of convex arcs each extending away from the user from said path location that is closest to the user's ear, a first of which extends in the space in front and to one side of the user and the other of which in the space behind and to the same side of the user.

12. The process of claim 11, wherein the group of candidate sound sources is initially limited to a prescribed number of sources which are played from consecutive locations on said first arc starting with the location that is closest to the user's ear.

13. The process of claim 5, wherein one of the path locations represents the closest path location to the user's ear and wherein the candidate sound source occupying said closest location at any one time is user-specified and is the only sound source selectable by the user, and wherein the process action of playing the selected source, comprises the actions of:

upon selection of the candidate sound source occupying said closest location to the user's ear by the user, ceasing to play the current audio sound source playing from the location adjacent the first of the user's ears, ceasing to play the group of candidate audio sound sources playing from the path locations adjacent the user's other ear, and playing the selected sound source using the audio equipment in a non-positional, multi-channel playback mode.

14. The process of claim 1, wherein the first of the user's ears corresponds to the user's non-dominant ear.

15. The process of claim 14, wherein the user specifies which of his or her ears is the dominant ear.

16. The process of claim 1, wherein the process actions of playing the current audio sound source such that it seems to the user to be coming from a location in a surrounding space adjacent the first of the user's ears and playing the group of candidate audio sound sources such that it seems to the user that each of the group of candidate sources is coming from a separate location in the surrounding space adjacent the user's other ear, are performed only after the user enters a preview command via said input device, and wherein the process further comprises the actions of:

upon entry of a cancellation command by the user via the input device prior to the selection of one of the candidate sound sources, ceasing to play the current sound source playing from the location adjacent the first of the user's ears, ceasing to play the group of candidate audio sound sources playing from the path locations adjacent the user's other ear, and playing the current sound source using the audio equipment in a non-positional, multi-channel playback mode.

17. The process of claim 1, further comprising the process actions of:

categorizing each of the plurality of sound sources in accordance with an identifying characteristic of the sources; and sequentially ordering the sound sources based on the categorization; and wherein the process action of playing the group of candidate audio sound sources, comprises an action of playing the group of candidate audio sound sources such that it seems to the user that each of the group of candidate sources is coming from a separate consecutive location within a pattern of locations forming a path extending away from the user in sequential order.

18. The process of claim 17, further comprising a process action of establishing aurally distinct audio markers each comprising a continuously repeated letter, word, phrase or other sound indicative of a demarcation between the sound source categories, and wherein the process action of playing the group of candidate audio sound sources, comprises an action of playing the audio marker associated with one or more candidate sound sources in a path location preceding the location or locations where the associated sound sources are playing.

19. A computer-readable storage medium having computer-executable instructions stored thereon for facilitating a user-comparison of a plurality of audio sound sources played using multi-channel audio equipment and a 3D positional audio capability and a user-selection of one of said sources using a user interface input device, said computer-executable instructions comprising:

playing a current audio sound source using the audio equipment such that the source seems to a user to be coming from a location in the surrounding space adjacent a first of the user's ears, and wherein the current sound source is the only sound source seeming to the user to be coming from the surrounding space adjacent the first of the user's ears;

playing a group of candidate audio sound sources from said plurality of sources using the audio equipment such that it seems to the user that each of the group of candidate sources is coming from a separate location in the surrounding space adjacent the user's other ear, thereby allowing the user to compare each of the candidate sound sources to the current sound source; and upon selection of one of the candidate sound sources by the user via said input device, playing the selected source using the audio equipment in a non-positional, multi-channel playback mode, wherein said non-positional, multi-channel playback mode is not a mode employing 3D positional audio wherein the selected candidate sound source seems to the user to be emanating from a particular location in the surrounding space, but instead is a mode wherein the selected candidate sound source seems to the user to be emanating from two or more locations in the surrounding space.

20. A computer-implemented process for facilitating a user-comparison of a plurality of audio sound sources played using multi-channel audio equipment and a 3D positional audio capability and a user-selection of one of said sources using a user interface input device, said process comprising:

using a computer to perform the following process actions:

playing a group of candidate audio sound sources from said plurality of sources using the audio equipment such that it seems to a user that each of the group of candidate sources is coming from a separate location in the surrounding space either (i) in front of the user, or (ii) in back of the user;

playing a current audio sound source using the audio equipment such that the source seems to the user to be coming from a location in the surrounding space substantially opposite of the locations where the group of candidate audio sound sources are playing, thereby allowing the user to compare each of the candidate sound sources to the current sound source, and wherein the current audio sound source is the only sound source seeming to the user to be coming from the surrounding space substantially opposite of the locations where the group of candidate audio sound sources are playing; and upon selection of one of the candidate sound sources by the user via said input device, playing the selected source using the audio equipment in a non-positional, multi-channel playback mode, wherein said non-positional, multi-channel playback mode is not a mode employing 3D positional audio wherein the selected candidate sound source seems to the user to be emanating from a particular location in the surrounding space, but instead is a mode wherein the selected candidate sound source seems to the user to be emanating from two or more locations in the surrounding space.

21. A system for presenting a plurality of audio sound sources to a user and playing one of said sources selected by the user, comprising:

a general purpose computing device comprising multi-channel audio equipment, a 3D positional audio capability and a user interface input device;

a computer program comprising program modules executed by the computing device, wherein the computing device is directed by the program modules of the computer program to, play a current audio source in a non-positional, multi-channel playback mode;

upon the user entering a preview command via said input device, categorizing each of the plurality of sound sources in accordance with an identifying characteristic of the sources, sequentially ordering the sound sources based on the categorization, establishing aurally distinct audio markers each comprising a continuously repeated letter, word, phrase or other sound indicative of a demarcation between the sound source categories, play the current audio sound source using the audio equipment such that the source seems to a user to be the only sound source coming from a location in the surrounding space adjacent a first of the user's ears, play a group of candidate audio sound sources from said plurality of sources using the audio equipment such that it seems to the user that each of the group of candidate sources is coming from a separate consecutive location within a pattern of locations forming a path extending away from the user in sequential order in the surrounding space adjacent the user's other ear, and that the audio marker associated with one or more candidate sound sources is playing in a path location preceding the location or locations where the associated sound sources are playing, thereby allowing the user to compare each of the candidate sound sources to the current sound source; and upon selection of one of the candidate sound sources by the user via said input device, play the selected source using the audio equipment in said non-positional, multi-channel playback mode, wherein said non-positional, multi-channel playback mode is not a mode employing 3D positional audio wherein the selected candidate sound source seems to the user to be emanating from a particular location in the surrounding space, but instead is a mode wherein the selected candidate sound source seems to the user to be emanating from two or more locations in the surrounding space.

* * * * *